(12) United States Patent
Jung (10) Patent No.: US 11,002,397 B2
(45) Date of Patent: May 11, 2021

(54) PIPE COUPLING MODULE

(71) Applicant: SEUNGJIN IND. CO., LTD, Gyeonggi-do (KR)

(72) Inventor: Woon Taek Jung, Gyeonggi-do (KR)

(73) Assignee: SEUNGJIN IND. CO., LTD

( * ) Notice: Subject to any disclaimer, the term of this patent is extended or adjusted under 35 U.S.C. 154(b) by 308 days.

(21) Appl. No.: 15/974,143

(22) Filed: May 8, 2018

(65) Prior Publication Data

US 2019/0162348 A1 May 30, 2019

(30) Foreign Application Priority Data

Nov. 29, 2017 (KR) .................. 10-2017-0161720

(51) Int. Cl.
*F16L 47/26* (2006.01)
*F16L 47/02* (2006.01)
*F16L 33/18* (2006.01)
*F16L 33/22* (2006.01)

(52) U.S. Cl.
CPC .............. *F16L 47/26* (2013.01); *F16L 33/18* (2013.01); *F16L 33/227* (2013.01); *F16L 47/02* (2013.01)

(58) Field of Classification Search
CPC ......... F16L 47/32; F16L 47/265; F16L 47/26; F16L 47/04; F16L 47/02; F16L 41/021; F16L 41/082; F16L 21/02; F16L 21/03
USPC ................ 285/382.4, 382.5, 21.2, 21.3, 903
See application file for complete search history.

(56) References Cited

U.S. PATENT DOCUMENTS

| | | | | |
|---|---|---|---|---|
| 3,123,337 | A * | 3/1964 | Peras ...................... | F16L 47/04 251/333 |
| 3,831,983 | A * | 8/1974 | Stickler .................. | F16L 19/025 285/12 |
| 4,013,309 | A * | 3/1977 | Quick .................. | F16L 55/1608 285/31 |
| 4,238,131 | A * | 12/1980 | Cleveland ........... | B29C 66/1222 285/38 |
| 5,090,743 | A * | 2/1992 | Obering ................ | F16L 13/142 285/133.21 |
| 5,484,172 | A * | 1/1996 | Unewisse ............. | F16L 13/142 285/148.19 |
| 6,540,261 | B1 * | 4/2003 | Painter .................... | A62C 35/68 169/37 |
| 7,987,690 | B2 * | 8/2011 | Duggan .................. | F16L 21/03 72/370.03 |
| 2007/0057502 | A1* | 3/2007 | Shafik ....................... | E03C 1/20 285/121.3 |
| 2008/0048438 | A1* | 2/2008 | Weise ..................... | F16L 47/32 285/125.1 |
| 2012/0000233 | A1* | 1/2012 | Eads ...................... | F16L 41/021 62/303 |
| 2013/0075645 | A1* | 3/2013 | Hung ...................... | F16K 27/06 251/366 |

(Continued)

*Primary Examiner* — David Bochna
(74) *Attorney, Agent, or Firm* — Mendelsohn Dunleavy, P.C.

(57) ABSTRACT

Disclosed is a pipe coupling module for coupling a distribution pipe and a flexible pipe in a water distribution system. The pipe coupling module includes a pipe branch section diverging from the distribution pipe, a pipe connection socket coupled directly to the pipe branch section, and a pipe joint unit coupling the flexible pipe, wherein the pipe branch section and the pipe connection socket are formed of chlorinated polyvinyl chloride (CPVC), and are joined by means of a solvent cement.

16 Claims, 10 Drawing Sheets

(56) References Cited

U.S. PATENT DOCUMENTS

2017/0051853 A1\* 2/2017 Wu .................... F16L 19/062
2017/0122473 A1\* 5/2017 Hayes, Jr. ............ F16L 19/061
2018/0363812 A1\* 12/2018 Fritskey ............... F16L 41/021

\* cited by examiner

PIPE COUPLING MODULE

CROSS REFERENCE TO RELATED APPLICATION(S)

This application claims the benefit of Korean Patent Application No. 10-2017-0161720, filed on Nov. 29, 2017, which is hereby incorporated by reference in its entirety into this application.

BACKGROUND OF THE INVENTION

Field of the Invention

The present invention relates generally to a pipe coupling module for a water distribution system such as in a building, wherein the pipe coupling module allows easy and reliable connection between a distribution pipe and a flexible pipe in the water distribution system.

Description of the Related Art

Generally, a water distribution system in a building for fire suppression, for example, includes vertical pipes, horizontal pipes, and sprinkler heads, which are connected to a water supply. Vertical pipes are located along walls of a building, and the horizontal pipes and sprinkler heads are located in ceilings of multiple floors of the building.

The water distribution system for fire suppression has flexible pipes between the horizontal pipes and the sprinkler heads. The flexible pipe is a polyvinyl chloride (PVC) pipe. The flexible pipe is connected to the horizontal pipe by means of a metal nipple.

The metal nipple to be coupled to the horizontal pipe has a different strength from the horizontal pipe. The coupling between the horizontal pipe and the metal nipple may be performed by means of a pipe connection joint, which is disclosed in Korean Utility Model Application Publication No. 20-2008-0004060.

The Korean Utility Model Publication disclosed the coupling between a pipe or hose made of synthetic resin and a metal nipple. However, since the pipe or hose has a low strength relative to the nipple, the pipe may be deformed in response of a motion of the nipple occurring due to external shock, causing cracks in the pipe.

Cracks may cause water leakage in the pipes, degrading the performance of the water distribution system.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to propose a pipe coupling module for a water distribution system, wherein the pipe coupling module allows easy and reliable connection between a distribution pipe and a flexible pipe in the water distribution system.

In order to achieve the above object, according to one aspect of the present invention, there is provided a pipe coupling module for coupling a distribution pipe and a flexible pipe in a water distribution system, the pipe coupling module including: a pipe branch section diverging from the distribution pipe; a pipe connection socket coupled directly to the pipe branch section; and a pipe joint unit coupling the flexible pipe, wherein the pipe branch section and the pipe connection socket are formed of chlorinated polyvinyl chloride (CPVC), and are joined by means of a solvent cement.

The pipe branch section may comprise a T-branch section or an elbow branch section having a communicating branch port diverging a fluid from the distribution pipe at a specified angle from a longitudinal direction of the distribution pipe.

The pipe connection socket may be fitted into the branch port around the distribution pipe, and the pipe joint unit may be screwed around the pipe connection socket at a position opposite to the pipe branch section, wherein the pipe joint unit may be formed of CPVC.

The pipe connection socket may have a first end fitted into the branch port, a second end disposed opposite to the first end and having a stepped outer surface extending with a downward inclination, the stepped outer surface having a plurality of step parts with one externally threaded step part among them, and an intermediate portion extending with an upward inclination between the first and second ends, and the pipe joint unit may have a stepped inner surface extending with a downward inclination, the stepped inner surface having a plurality of step parts with one internally threaded step part among them to correspond to the stepped outer surface of the second end so that, when coupled to the pipe connection socket, the inner surface of the pipe joint unit, including the stepped parts along with the internally threaded step part, is meshed with the outer surface of the second end of the pipe connection socket, including the stepped parts along with the externally threaded step part such that an outer surface of the pipe joint unit is flush with an outermost surface of the intermediate portion of the pipe connection socket.

The pipe connection socket may be fitted around the branch port around the distribution pipe, and the pipe joint unit may be screwed around the pipe connection socket at a position opposite to the pipe branch section, wherein the pipe joint unit may be formed of CPVC.

The pipe connection socket may have a first end fitted around the branch port of the pipe branch section, a second end disposed opposite to the first end and having a stepped outer surface extending a downward inclination towards an end side of the second end, the stepped outer surface having a plurality of step parts with one externally threaded step part among them, and an intermediate portion extending from the first end towards the second end with an upward inclination, wherein the pipe joint unit may have a stepped inner surface extending with a downward inclination, the stepped inner surface having a plurality of step parts with one internally threaded step part among them to correspond to the step parts of the second end so that, when coupled to the pipe connection socket, the inner surface of the pipe joint unit, including the stepped parts along with the internally threaded step part, is meshed with the outer surface of the second end of the pipe connection socket, including the stepped parts along with the externally threaded step part, such that an outer surface of the pipe joint unit has a stepped level from an outermost surface of the intermediate portion of the pipe connection socket.

The pipe connection socket may be coupled around the branch port of the pipe branch section around the distribution pipe, wherein the pipe joint unit may have a set of rings fitted into a plurality of recesses provided on the inner surface of the second end of the pipe connection socket at a position opposite to the pipe branch section, the set of rings being formed of rubber, and wherein the flexible pipe may be partially coupled to the pipe connection socket at a position opposite to the pipe branch section such that the flexible pipe is compressed by the pipe joint unit in the pipe connection socket.

The pipe connection socket may have a first end fitted around the branch port of the pipe branch section, a second end disposed opposite to the first end and sequentially having, on an inner surface thereof, a first recess for a circumferentially-cut pad ring, a second recess for a pad ring, and a third recess for an O-ring in a direction towards an end side of the second end, with a step part provided around the first recess towards the first end, and an intermediate portion extending from the first end towards the second end with a downward inclination, wherein the pipe joint unit may have a circumferentially-cut pad ring, a pad ring, and an O-ring fitted into the first to third recesses, respectively, provided on the inner surface of the second end of the pipe connection socket, and wherein the flexible pipe may have a first enlarged portion for the circumferentially-cut pad ring, a second enlarged portion for the pad ring, and a third enlarged portion for the O-ring between a leading end thereof around the circumferentially-cut pad ring and a stopper protrusion thereof immediately outside of the pipe connection socket, forming an irregular portion in the pipe connection socket, such that, when coupled to the pipe connection socket, the irregular portion of the flexible pipe contacts the pipe connection socket and the pipe joint unit.

The pipe connection socket may be fitted into the branch port of the pipe branch section around the distribution pipe, wherein the pipe joint unit may have a set of rings fitted into a plurality of recesses provided on the inner surface of the second end of the pipe connection socket, the set of rings being formed of rubber, and wherein the flexible pipe may be partially fitted into the pipe connection socket at a position opposite to the pipe branch section.

The pipe connection socket may have a first end fitted into the branch port of the pipe branch section, a second end disposed opposite to the first end and sequentially having, on an inner surface thereof, a first recess for a circumferentially-cut pad ring, a second recess for a pad ring, and a third recess for an O-ring in a direction towards an end side of the second end, and an intermediate portion extending from the first end towards the second end with an upward inclination, and wherein the pipe joint unit may have a circumferentially-cut pad ring, a pad ring, and an O-ring fitted into the first to third recesses, respectively, provided on the inner surface of the second end of the pipe connection socket.

The first recess for the circumferentially-cut pad ring has a step part at a middle portion thereof, wherein the flexible pipe may have a first enlarged portion for the circumferentially-cut pad ring, a second enlarged portion for the pad ring, and a third enlarged portion for the O-ring, forming an irregular portion in the pipe connection socket, such that, when coupled to the pipe connection socket, the irregular portion of the flexible pipe contacts the pipe connection socket and the pipe joint unit, and wherein the flexible pipe may have a leading end thereof disposed immediately outside of the step part around the first enlarged portion for the circumferentially-cut pad ring, and a stopper protrusion immediately outside of the pipe connection socket, wherein the first enlarged portion for the circumferentially-cut pad ring extends from the leading end in the first recess with a downward inclination, such that the first enlarged portion is compressed by the circumferentially-cut pad ring in the first recess outside of the step part.

According to the present invention, in the water distribution system for fire suppression, the pipe branch section connected to the distribution pipe and the pipe connection socket coupling the flexible pipe are all formed of CPVC and directly joined together by means of the solvent cement without screw-coupling, thereby simplifying plumbing.

Further, in order to connect the distribution pipe and the flexible pipe, respectively, in the water distribution system for fire suppression, the pipe branch section and the pipe connection socket, which are formed of the same material (i.e. CPVC), are connected between the distribution pipe and the flexible pipe, thereby preventing the pipe branch section and the pipe connection socket from being cracked during the service life of the water distribution system and thus ensuring reliable plumbing.

Still further, in order to connect the distribution pipe and the flexible pipe, respectively, in the water distribution system for fire suppression, the distribution pipe, the pipe branch section, and the pipe connection socket are formed of the same material (i.e. CPVC), and the flexible pipe has enlarged portions which are disposed in inner recesses of the pipe connection socket when coupled to the pipe connection socket, thereby enabling simple and reliable plumbing without using a metal nipple.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION OF THE INVENTION

Hereinbelow, preferred embodiments of the present invention will be described in detail with reference to the accompanying drawings to allow those skilled in the art to easily implement the present invention. In the following description, however, it is to be noted that the description of functions or configurations of conventional elements will be omitted to prevent making the gist of the present invention unclear.

Figure 1:
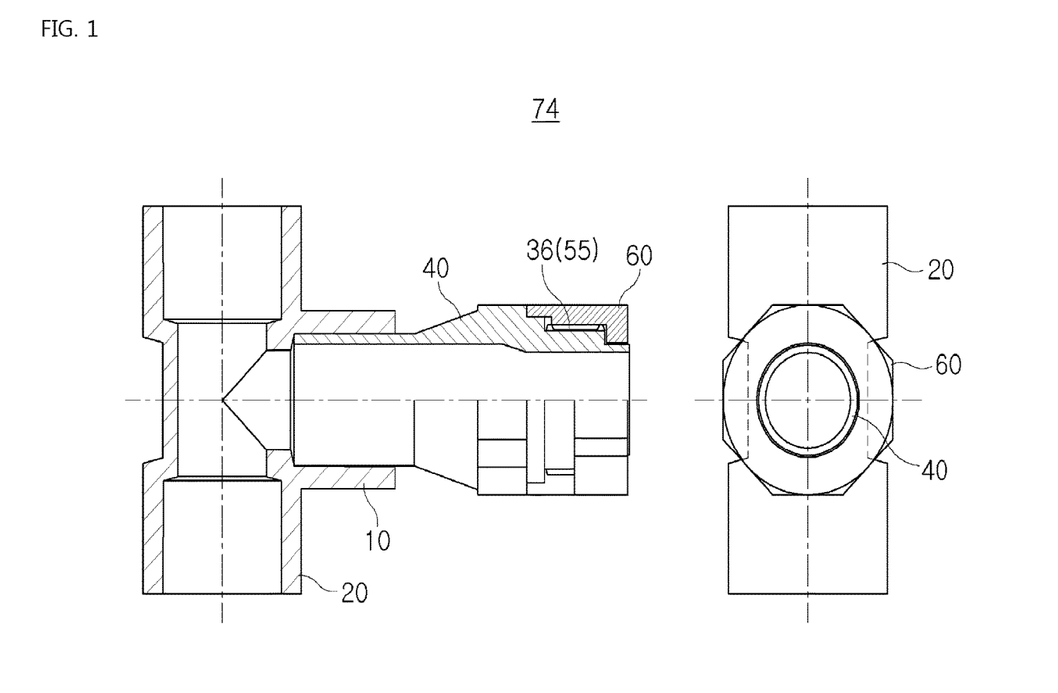
FIGS. 1 to 3 are schematic views illustrating a pipe coupling module for a water distribution system according to a first embodiment of the present invention.
Figure 2:
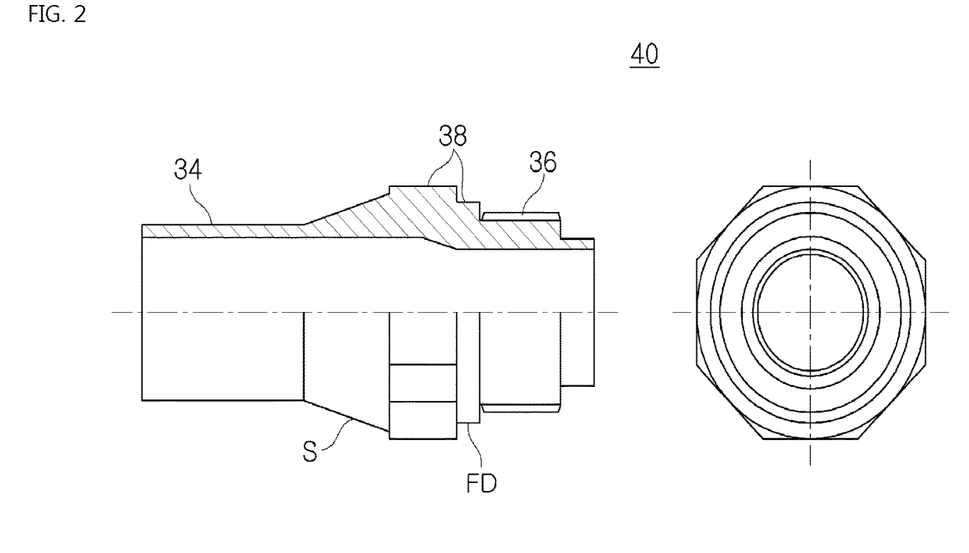
Figure 3:
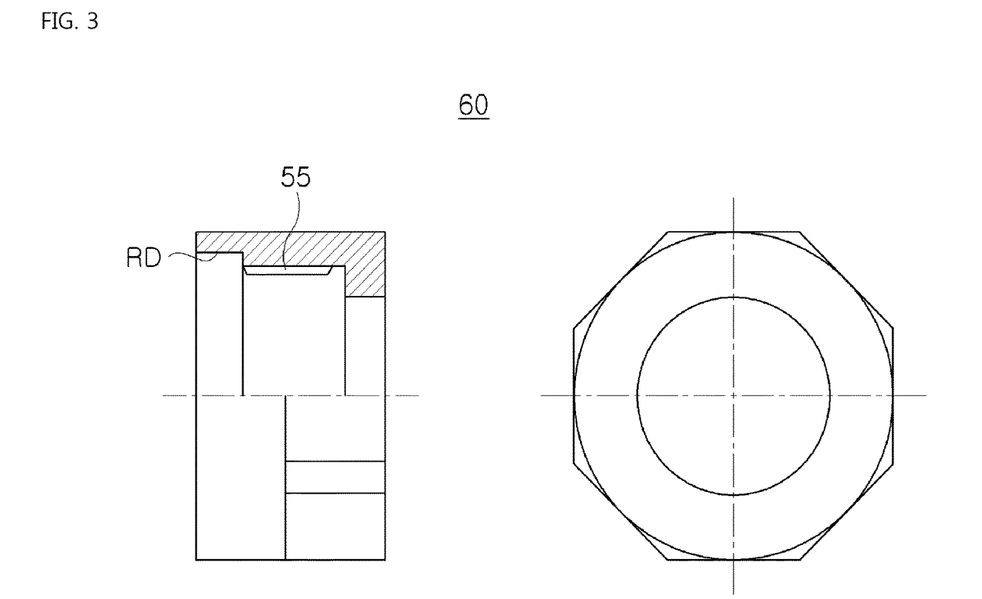

FIGS. 1 to 3 are schematic views illustrating a pipe coupling module for a water distribution system according to a first embodiment of the present invention.

Figure 18:
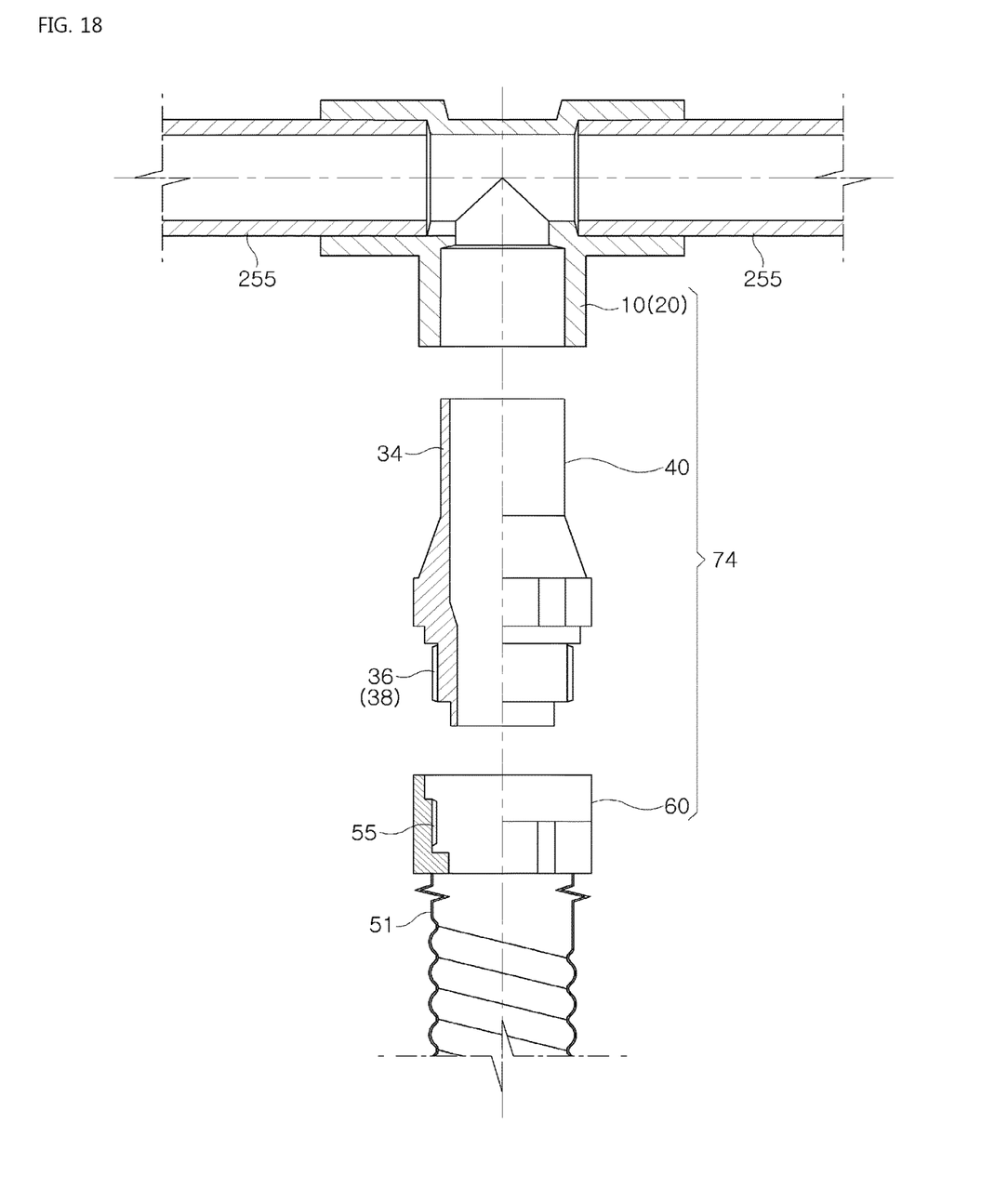
FIG. 18 is a schematic view illustrating a procedure of assembling the pipe coupling module of FIG. 1.

Referring to FIGS. 1 to 3, the pipe coupling module 74 is provided in a water distribution system (not shown), which is used for fire suppression, which system includes a distribution pipe (255 in FIG. 18) and a flexible pipe (51 in FIG. 18). The pipe coupling module 74 includes a pipe branch section 20 diverging from the distribution pipe, a pipe connection socket 40, and a pipe joint unit 60.

The pipe branch section 20 includes a T-branch section or an elbow branch section having a branch port 10 which fluid-communicates with and diverges from the distribution pipe 255 at a specified angle from a longitudinal direction of the distribution pipe 255.

Here, the distribution pipe 255 is formed of chlorinated polyvinyl chloride (CPVC). The pipe connection socket 40 is connected directly to the pipe branch section 20. Specifically, the pipe branch section 20 and the pipe connection socket 40 are formed of CPVC, and are joined together by means of a solvent cement.

Here, the pipe connection socket 40 is fitted into the branch port 10 around the distribution pipe 255. Specifically, the pipe connection socket 40 has a first end 34 which is fitted into the branch port 10, a second end 38 which is disposed opposite to the first end 34 and has a stepped outer surface, which is downwardly inclined towards an end side of the second end and has a plurality of step parts FD having one externally threaded step part 36 among them, and an upwardly-inclined intermediate portion which is disposed between the first and second ends with a slope S.

The pipe joint unit 60 is screwed around the pipe connection socket 40 at a position opposite to the pipe branch section 20, wherein the pipe joint unit is formed of CPVC.

Specifically, the pipe joint unit 60 is disposed around the second end 38 of the pipe connection socket 40, and has a downwardly-inclined stepped inner surface with a plurality of step parts RD having one internally threaded step part 55 among them to correspond to the downwardly-inclined stepped outer surface FD of the second end so that, when coupled to the pipe connection socket 40, the inner surface of the pipe joint unit, including the stepped parts RD along with the internally threaded step part 55, is meshed with the outer surface of the second end 38 of the pipe connection socket 40, including the stepped parts FD along with the externally threaded step part 36, such that an outer surface of the pipe joint unit is flush with an outermost surface of the intermediate portion of the pipe connection socket 40.

The flexible pipe 51 is coupled to the pipe joint unit 60, and extends from the pipe joint unit 60 as illustrated in FIG. 18. Specifically, although not shown in the drawings, the flexible pipe 51 can be fastened to the inside of the pipe joint unit 60 by means of a joint member provided in the pipe joint unit 60. The flexible pipe 51 may be a corrugated pipe formed of tungsten (W).

Figure 4:
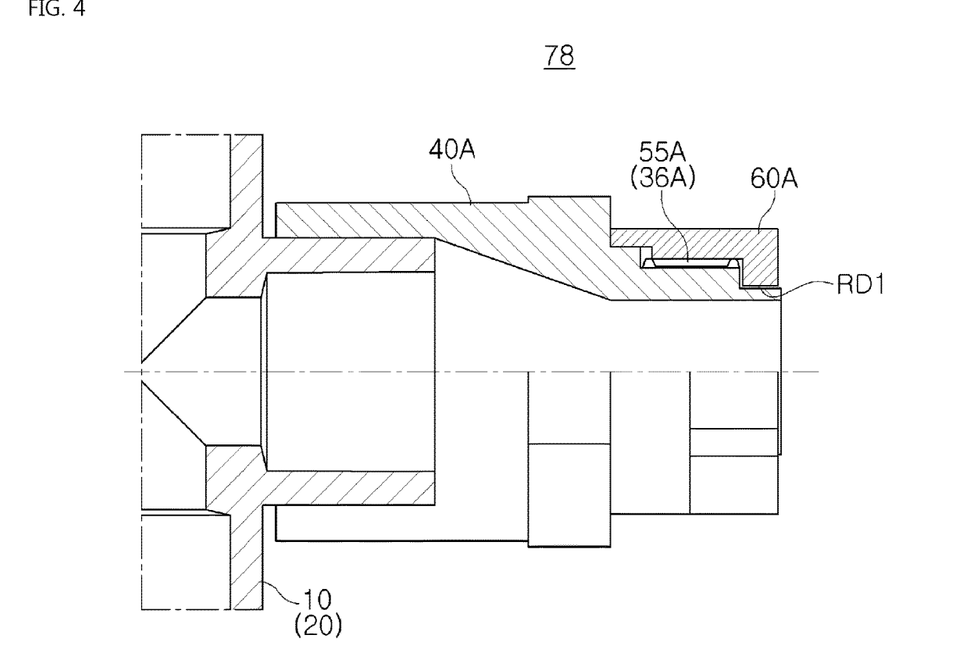
FIGS. 4 and 5 are schematic views illustrating a pipe coupling module for a water distribution system according to a second embodiment of the present invention.
Figure 5:
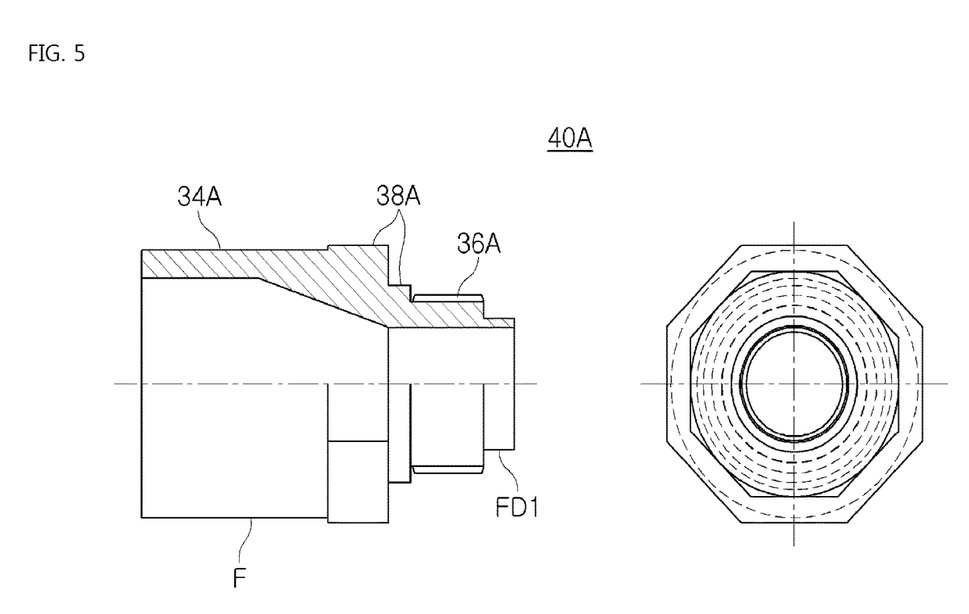

FIGS. 4 and 5 are schematic views illustrating a pipe coupling module 78 for a water distribution system according to a second embodiment of the present invention.

Referring to FIGS. 4 and 5, the pipe coupling module 78 is similar to the pipe coupling module 74 of FIGS. 1 to 3, except that a pipe connection socket 40A and a pipe joint unit 60A have different structures from those of the pipe connection socket 40 and the pipe joint unit 60 of FIGS. 1 to 3.

That is, the pipe connection socket 40A is coupled around the branch port 10 of the pipe branch section 20 around the distribution pipe (255 in FIG. 18). Specifically, the pipe connection socket 40A has a first end 34A which is fitted around the branch port 10 of the pipe branch section 20, a second end 38A which is disposed opposite to the first end 34A and has a stepped outer surface, which is downwardly inclined towards an end side of the second end 38A and has a plurality of step parts FD1 having one externally threaded step part 36A among them, and an intermediate portion which extends from the first end 34A towards the second ends at a substantially same level F as the first end 34A or at an upwardly-inclined angle.

The pipe joint unit 60A is screwed around the pipe connection socket 40A at a position opposite to the pipe branch section 20, wherein the pipe joint unit is formed of CPVC. Specifically, the pipe joint unit 60A is disposed around the second end 38A of the pipe connection socket 40A.

The pipe joint unit 60A has a downwardly-inclined stepped inner surface with a plurality of step parts RD1 having one internally threaded step part 55A among them to correspond to the downwardly-inclined step parts FD1 of the second end so that, when coupled to the pipe connection socket 40A, the inner surface of the pipe joint unit, including the stepped parts RD1 along with the internally threaded step part 55A, is meshed with the outer surface of the second end 38A of the pipe connection socket 40A, including the stepped parts FD1 along with the externally threaded step part 36A, such that an outer surface of the pipe joint unit has a stepped level from an outermost surface of the intermediate portion of the pipe connection socket 40A.

Figure 6:
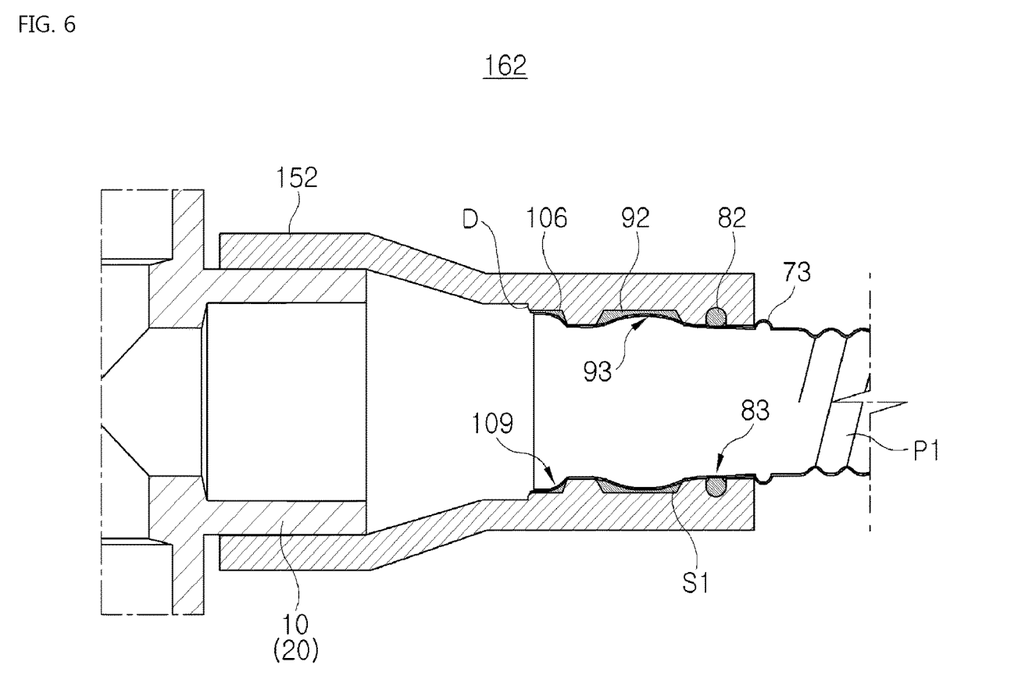
FIGS. 6 and 7 are schematic views illustrating a pipe coupling module for a water distribution system according to a third embodiment of the present invention.
Figure 7:
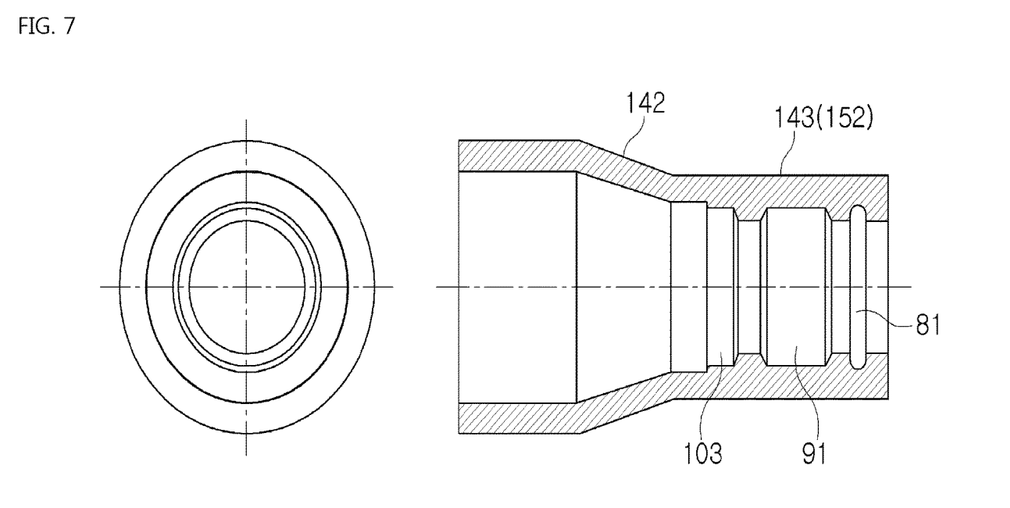

FIGS. 6 and 7 are schematic views illustrating a pipe coupling module 162 for a water distribution system according to a third embodiment of the present invention.

Referring to FIGS. 6 and 7, the pipe coupling module 162 is similar to the pipe coupling module 74 of FIGS. 1 to 3, except that a pipe connection socket 152, a pipe joint unit S1, and a flexible pipe P1 have different structures from those of the pipe connection socket 40, the pipe joint unit 60, and the flexible pipe 51 of FIGS. 1 to 3.

That is, the pipe connection socket 152 is coupled around the branch port 10 of the pipe branch section 20 around the distribution pipe (255 in FIG. 18). Specifically, the pipe connection socket 152 has a first end 142 which is fitted around the branch port 10 of the pipe branch section 20, a second end 143 which is disposed opposite to the first end 142 and sequentially has, on an inner surface thereof, a first recess 103 for a circumferentially-cut pad ring, a second recess 91 for a pad ring, and a third recess 81 for an O-ring in a direction towards an end side of the second end 143, with a step part D provided around the first recess 103 towards the first end 142, and an intermediate portion extending from the first end 142 towards the second end 143 with a downward inclination.

The pipe joint unit S1 includes a set of rings that are fitted into the recesses 103, 91, and 81 provided on the inner surface of the second end of the pipe connection socket 152 at a position opposite to the pipe branch section 20, wherein the set of rings are formed of rubber. Specifically, the pipe joint unit S1 includes a circumferentially-cut pad ring 106, a pad ring 92, and an O-ring 82 fitted into the first to third recesses 103, 91, and 81, respectively, provided on the inner surface of the second end of the pipe connection socket 152.

Further, the flexible pipe P1 is partially coupled to the pipe connection socket 152 at a position opposite to the pipe branch section 20 such that the flexible pipe is compressed by the pipe joint unit S1 in the pipe connection socket 152. Specifically, the flexible pipe P1 has a first enlarged portion 109 for the circumferentially-cut pad ring 106, a second enlarged portion 93 for the pad ring 92, and a third enlarged portion 83 for the O-ring 82 between a leading end thereof around the circumferentially-cut pad ring 106 and a stopper protrusion 73 thereof immediately outside of the pipe connection socket 152, forming an irregular portion in the pipe connection socket 152, such that, when coupled to the pipe connection socket, the irregular portion of the flexible pipe P1 contacts the pipe connection socket 152 and the pipe joint unit S1.

Figure 8:
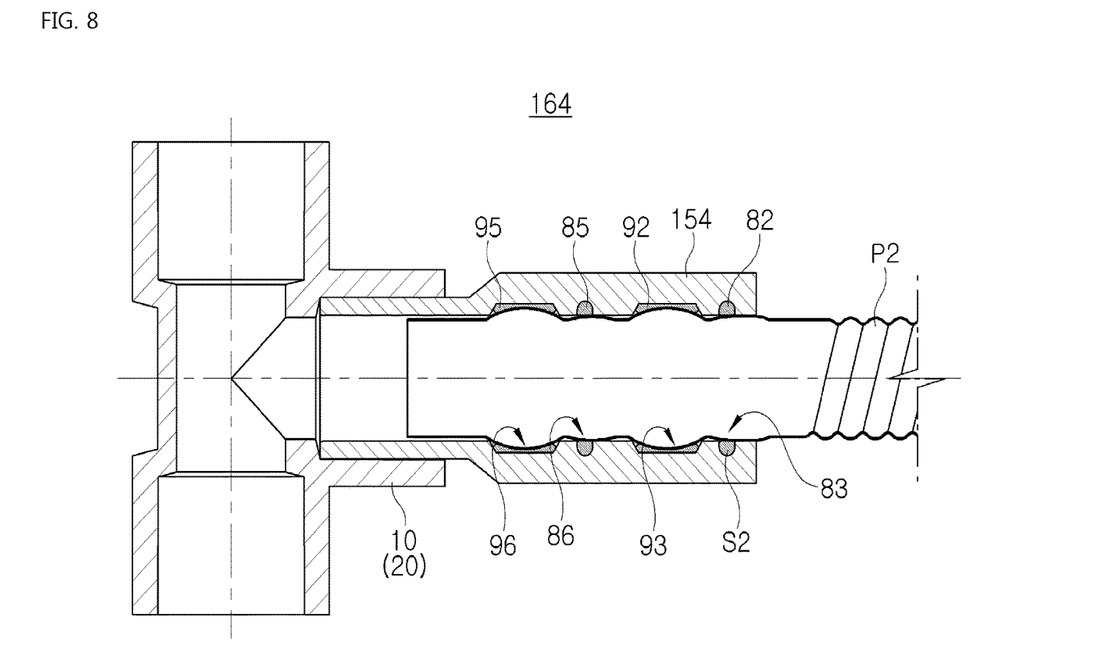
FIGS. 8 and 9 are schematic views illustrating a pipe coupling module for a water distribution system according to a fourth embodiment of the present invention.
Figure 9:
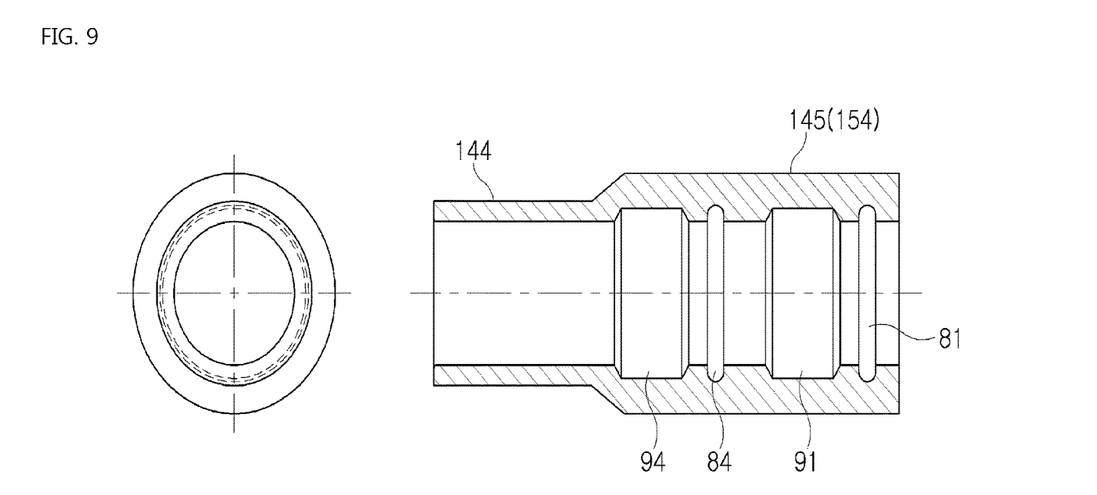

FIGS. 8 and 9 are schematic views illustrating a pipe coupling module 164 for a water distribution system according to a fourth embodiment of the present invention.

Referring to FIGS. 8 and 9, the pipe coupling module 164 is similar to the pipe coupling module 74 of FIGS. 1 to 3, except that a pipe connection socket 154, a pipe joint unit S2, and a flexible pipe P2 have different structures from those of the pipe connection socket 40, the pipe joint unit 60, and the flexible pipe 51 of FIGS. 1 to 3.

That is, the pipe connection socket 154 is fitted into the branch port 10 of the pipe branch section 20 around the distribution pipe (255 in FIG. 18). Specifically, the pipe connection socket 154 has a first end 144 which is fitted into the branch port 10 of the pipe branch section 20, a second end 145 which is disposed opposite to the first end 144 and sequentially has, on an inner surface thereof, a first recess 94 for a first pad ring, a second recess 84 for a first O-ring, a third recess 91 for a second pad ring, and a fourth recess 81 for a second O-ring in a direction towards an end side of the second end 145, and an intermediate portion extending from the first end 144 towards the second end 145 with an upward inclination.

The pipe joint unit S2 includes a set of rings that are fitted into the recesses 94, 84, 91, 81 provided on the inner surface of the second end of the pipe connection socket 154 at a position opposite to the pipe branch section 20, wherein the set of rings are formed of rubber. Specifically, the pipe joint unit S2 includes a first pad ring 95, a first O-ring 85, a second pad ring 92, and a second O-ring 82 fitted into the first to fourth recesses 94, 84, 91, 81, respectively, provided on the inner surface of the second end of the pipe connection socket 154.

Further, the flexible pipe P2 is partially coupled to the pipe connection socket 154 at a position opposite to the pipe branch section 20 such that the flexible pipe is compressed by the pipe joint unit S2 in the pipe connection socket 154. Specifically, the flexible pipe P2 has a first enlarged portion 96 for the first pad ring 95, a second enlarged portion 86 for the first O-ring 85, a third enlarged portion 93 for the second pad ring 92, and a fourth enlarged portion 83 for the second O-ring 82, forming an irregular portion in the pipe connection socket 154, with a leading end thereof disposed around the first enlarged portion 96 for the first pad ring towards the first end 144 of the pipe connection socket 154, such that, when coupled to the pipe connection socket, the irregular portion of the flexible pipe P2 contacts the pipe connection socket 154 and the pipe joint unit S2.

Figure 10:
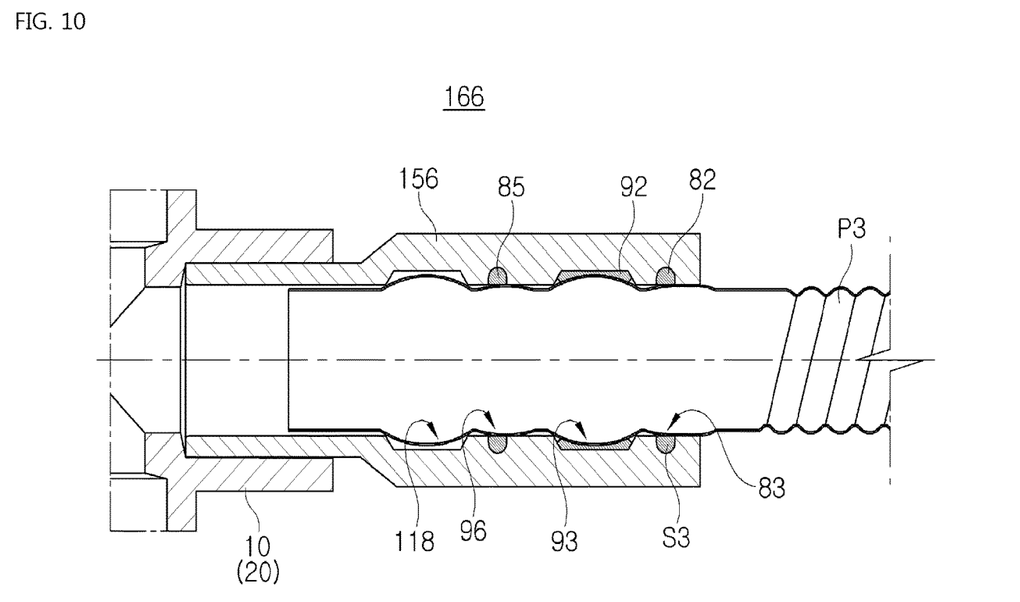
FIGS. 10 and 11 are schematic views illustrating a pipe coupling module for a water distribution system according to a fifth embodiment of the present invention.
Figure 11:
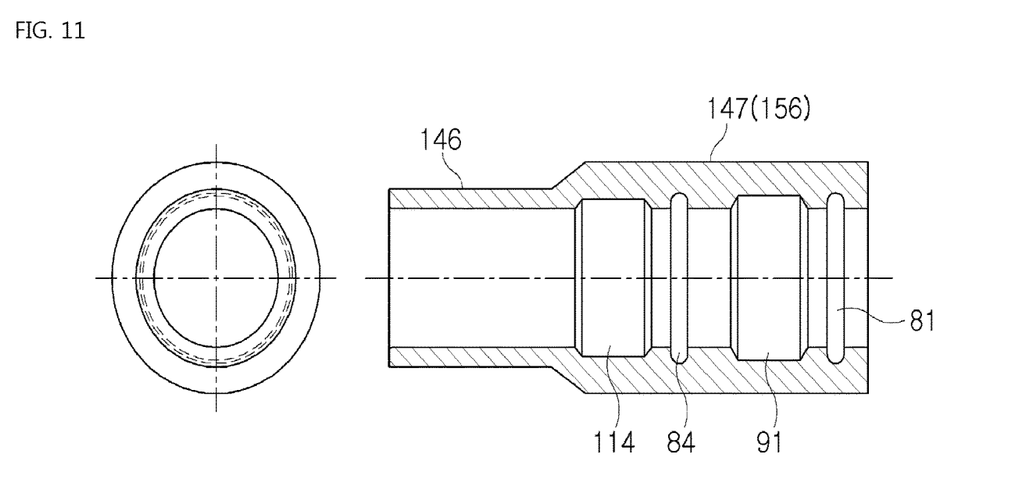

FIGS. 10 and 11 are schematic views illustrating a pipe coupling module 166 for a water distribution system according to a fifth embodiment of the present invention.

Referring to FIGS. 10 and 11, the pipe coupling module 166 is similar to the pipe coupling module 74 of FIGS. 1 to 3, except that a pipe connection socket 156, a pipe joint unit S3, and a flexible pipe P3 have different structures from those of the pipe connection socket 40, the pipe joint unit 60, and the flexible pipe 51 of FIGS. 1 to 3.

The pipe connection socket 156 has a first end 146 which is fitted into the branch port 10 of the pipe branch section 20, a second end 147 which is disposed opposite to the first end 146 and sequentially has, on an inner surface thereof, a first recess 114 for an enlarged portion of a pipe, a second recess 84 for a first O-ring, a third recess 91 for a pad ring, and a fourth recess 81 for a second O-ring in a direction towards an end side of the second end 147, and an intermediate portion extending from the first end 146 towards the second end 147 with an upward inclination.

The pipe joint unit S3 includes a first O-ring 85, a pad ring 92, and a second O-ring 82 fitted into the second to fourth recesses 84, 91, 81, respectively, provided on the inner surface of the second end of the pipe connection socket 156.

Further, the flexible pipe P3 has a first enlarged portion 118 for the first recess 114, a second enlarged portion 96 for the first O-ring 85, a third enlarged portion 93 for the pad ring 92, and a fourth enlarged portion 83 for the first O-ring 82, forming an irregular portion in the pipe connection socket 156, with a leading end thereof disposed around the first enlarged portion 118 for the first recess towards the first end 146 of the pipe connection socket 156, such that, when coupled to the pipe connection socket, the irregular portion of the flexible pipe P3 contacts the pipe connection socket 156 and the pipe joint unit S3.

The structure of the pipe coupling module 166 is similar generally to that of the pipe coupling module 164 of FIGS. 8 and 9.

Figure 12:
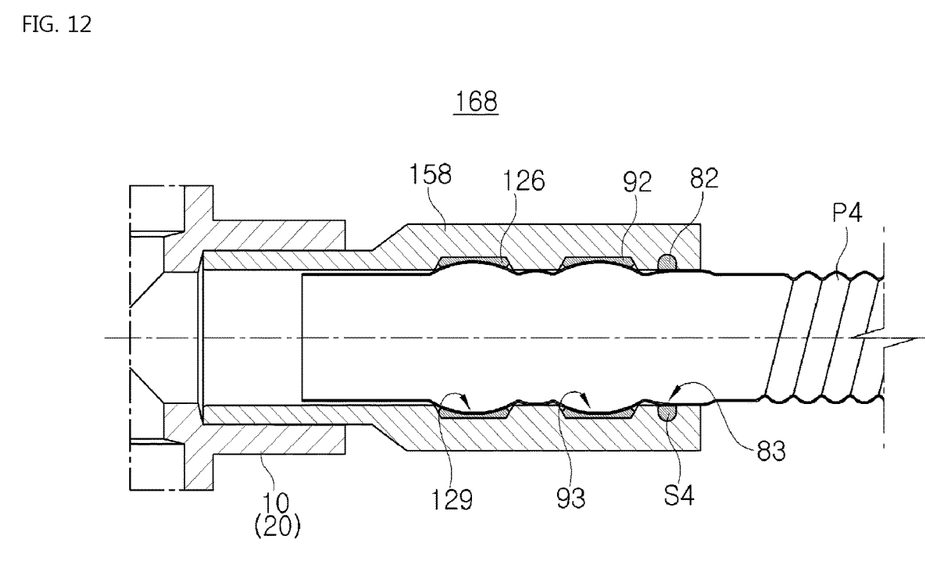
FIGS. 12 and 13 are schematic views illustrating a pipe coupling module for a water distribution system according to a sixth embodiment of the present invention.
Figure 13:
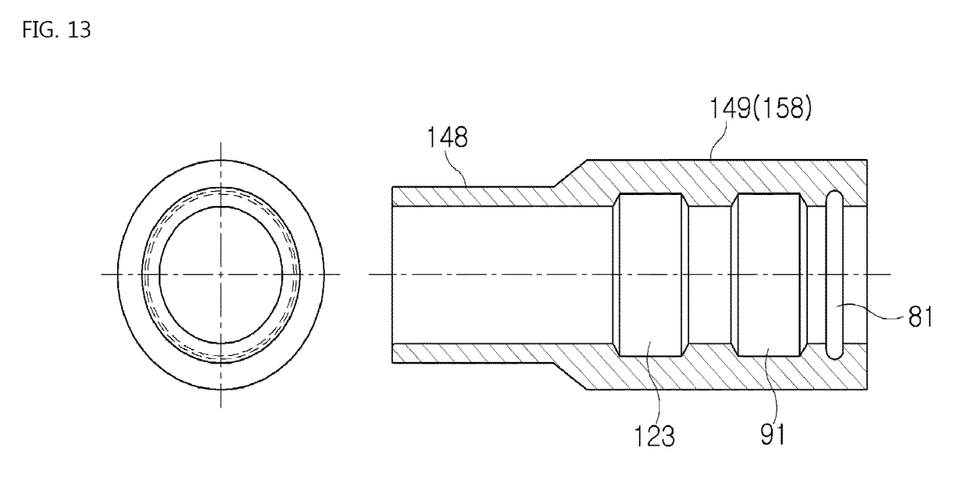

FIGS. 12 and 13 are schematic views illustrating a pipe coupling module 168 for a water distribution system according to a sixth embodiment of the present invention.

Referring to FIGS. 12 and 13, the pipe coupling module 168 is similar to the pipe coupling module 74 of FIGS. 1 to 3, except that a pipe connection socket 158, a pipe joint unit S4, and a flexible pipe P4 have different structures from those of the pipe connection socket 40, the pipe joint unit 60, and the flexible pipe 51 of FIGS. 1 to 3.

The pipe connection socket 158 has a first end 148 which is fitted into the branch port 10 of the pipe branch section 20, a second end 149 which is disposed opposite to the first end 148 and sequentially has, on an inner surface thereof, a first recess 123 for a first pad ring, a second recess 91 for a second pad ring, and a third recess 81 for an O-ring in a direction towards an end side of the second end 149, and an intermediate portion extending from the first end 148 towards the second end 149 with an upward inclination.

The pipe joint unit S4 includes a first pad ring 126, a second pad ring 92, and an O-ring 82 fitted into the first to third recesses 123, 91, 81, respectively, provided on the inner surface of the second end of the pipe connection socket 158.

Further, the flexible pipe P3 has a first enlarged portion 129 for the first pad ring 126, a second enlarged portion 93 for the second pad ring 92, and a third enlarged portion 83 for the O-ring 82, forming an irregular portion in the pipe connection socket 158, with a leading end thereof disposed around the first enlarged portion 129 for the first pad ring towards the first end 148 of the pipe connection socket 158, such that, when coupled to the pipe connection socket, the irregular portion of the flexible pipe P3 contacts the pipe connection socket 158 and the pipe joint unit S4.

Figure 14:
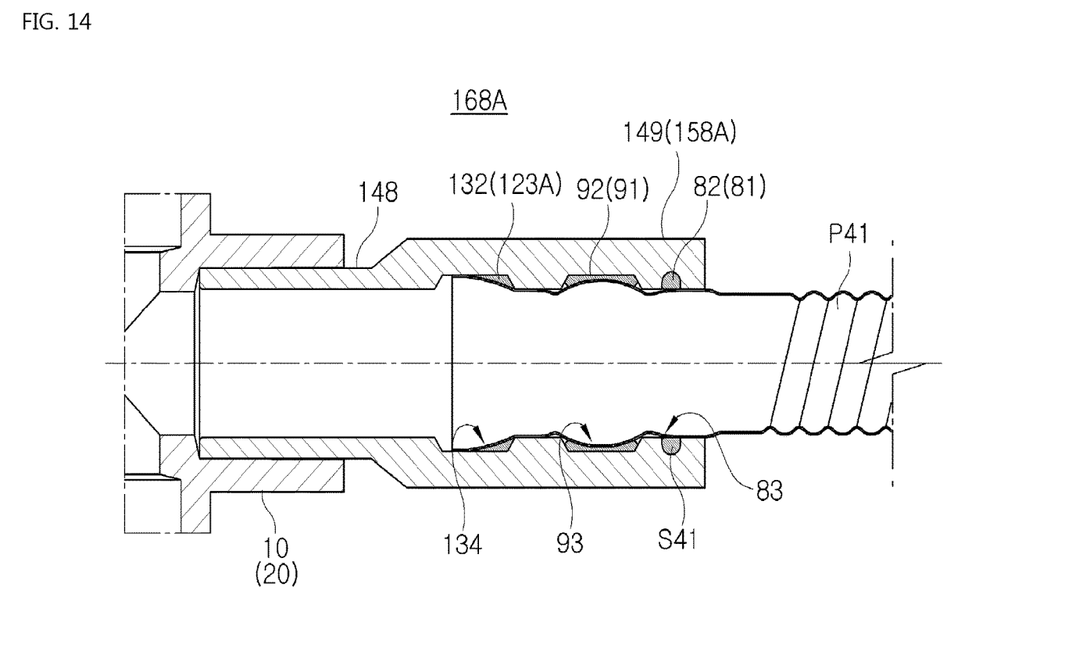
FIG. 14 is a schematic view illustrating a pipe coupling module for a water distribution system according to a seventh embodiment of the present invention.

FIG. 14 is a schematic view illustrating a pipe coupling module 168A for a water distribution system according to a seventh embodiment of the present invention.

Referring to FIG. 14, the pipe coupling module 168A is similar to the pipe coupling module 74 of FIGS. 1 to 3, except that a pipe connection socket 158A, a pipe joint unit S41, and a flexible pipe P41 have different structures from those of the pipe connection socket 40, the pipe joint unit 60, and the flexible pipe 51 of FIGS. 1 to 3.

The pipe connection socket 158A has a first end 148 which is fitted into the branch port 10 of the pipe branch section 20, a second end 149 which is disposed opposite to the first end 148 and sequentially has, on an inner surface thereof, a first recess 123A for a circumferentially-cut pad ring, a second recess 91 for a pad ring, and a third recess 81 for an O-ring in a direction towards an end side of the second end 149, and an intermediate portion extending from the first end 148 towards the second end 149 with an upward inclination.

The pipe joint unit S41 includes a circumferentially-cut pad ring 132, a pad ring 92, and an O-ring 82 fitted into the first to third recesses 123A, 91, 81, respectively, provided on the inner surface of the second end of the pipe connection socket 158A.

The flexible pipe P41 has a first enlarged portion 134 for the circumferentially-cut pad ring 132, a second enlarged portion 93 for the pad ring 92, and a third enlarged portion 83 for the O-ring 82, forming an irregular portion in the pipe connection socket 158A such that, when coupled to the pipe connection socket, the irregular portion of the flexible pipe P41 contacts the pipe connection socket 158A and the pipe joint unit S41.

Further, the flexible pipe P41 has a leading end thereof disposed around the first enlarged portion 134 for the circumferentially-cut pad ring 132, wherein the first enlarged portion for the circumferentially-cut pad ring 132 extends, from the leading end, by a length equal to or larger than a longitudinally-half length of the first recess 123A for the circumferentially-cut pad ring, in the first recess, with a downward inclination, such that the first enlarged portion 134 is compressed by the circumferentially-cut pad ring 132 in the first recess 123A.

The structure of the pipe coupling module 168A is similar generally to that of the pipe coupling module 168 of FIGS. 12 and 13.

Figure 15:
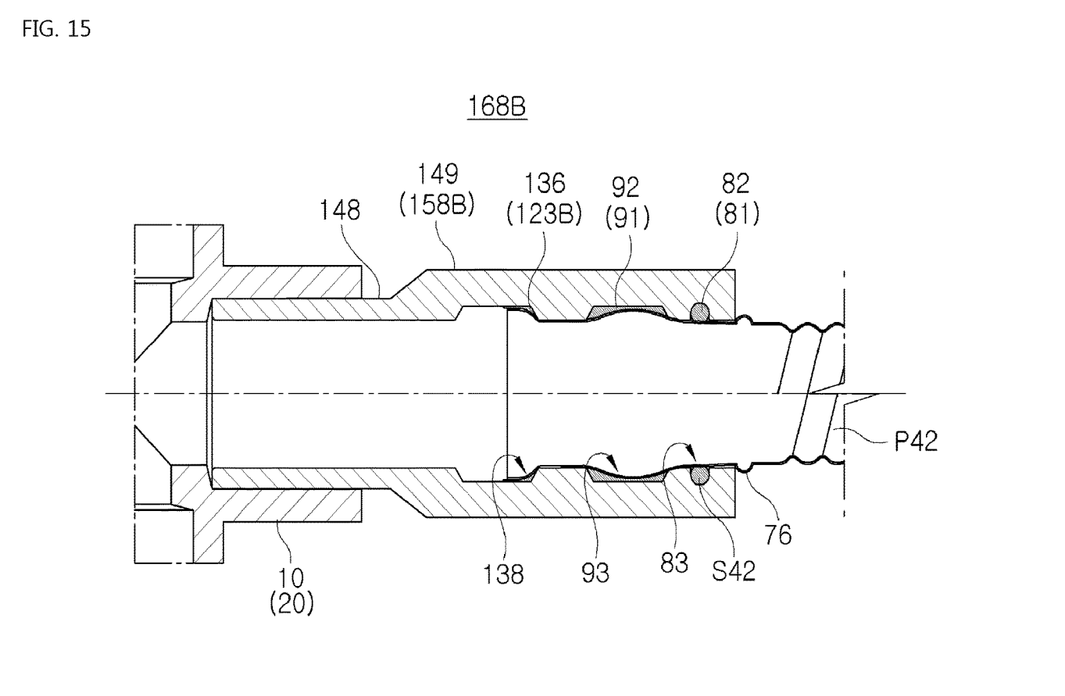
FIG. 15 is a schematic view illustrating a pipe coupling module for a water distribution system according to an eighth embodiment of the present invention.

FIG. 15 is a schematic view illustrating a pipe coupling module 168B for a water distribution system according to an eighth embodiment of the present invention.

Referring to FIG. 15, the pipe coupling module 168B is similar to the pipe coupling module 74 of FIGS. 1 to 3, except that a pipe connection socket 158B, a pipe joint unit S42, and a flexible pipe P42 have different structures from those of the pipe connection socket 40, the pipe joint unit 60, and the flexible pipe 51 of FIGS. 1 to 3.

The pipe connection socket 158B has a first end 148 which is fitted into the branch port 10 of the pipe branch section 20, a second end 149 which is disposed opposite to the first end 148 and sequentially has, on an inner surface thereof, a first recess 123B for a circumferentially-cut pad ring, a second recess 91 for a pad ring, and a third recess 81 for an O-ring in a direction towards an end side of the second end 149, and an intermediate portion extending from the first end 148 towards the second end 149 with an upward inclination.

The pipe joint unit S42 includes a circumferentially-cut pad ring 136, a pad ring 92, and an O-ring 82 fitted into the first to third recesses 123B, 91, 81, respectively, provided on the inner surface of the second end of the pipe connection socket 158B.

The flexible pipe P42 has a first enlarged portion 138 for the circumferentially-cut pad ring 136, a second enlarged portion 93 for the pad ring 92, and a third enlarged portion 83 for the O-ring 82, forming an irregular portion in the pipe connection socket 158B such that, when coupled to the pipe connection socket, the irregular portion of the flexible pipe P42 contacts the pipe connection socket 158B and the pipe joint unit S42.

Further, the flexible pipe P42 has a leading end thereof disposed around the first enlarged portion 138 for the circumferentially-cut pad ring 136, and a stopper protrusion 76 immediately outside of the pipe connection socket 158B, wherein the first enlarged portion 138 for the circumferentially-cut pad ring 136 extends, from the leading end, by a length smaller than a longitudinally-half length of the first recess 123B for the circumferentially-cut pad ring, in the first recess, with a downward inclination, such that the first enlarged portion 138 is compressed by the circumferentially-cut pad ring 136 in the first recess 123B.

The structure of the pipe coupling module 168B is similar generally to that of the pipe coupling module 168 of FIGS. 12 and 13.

Figure 16:
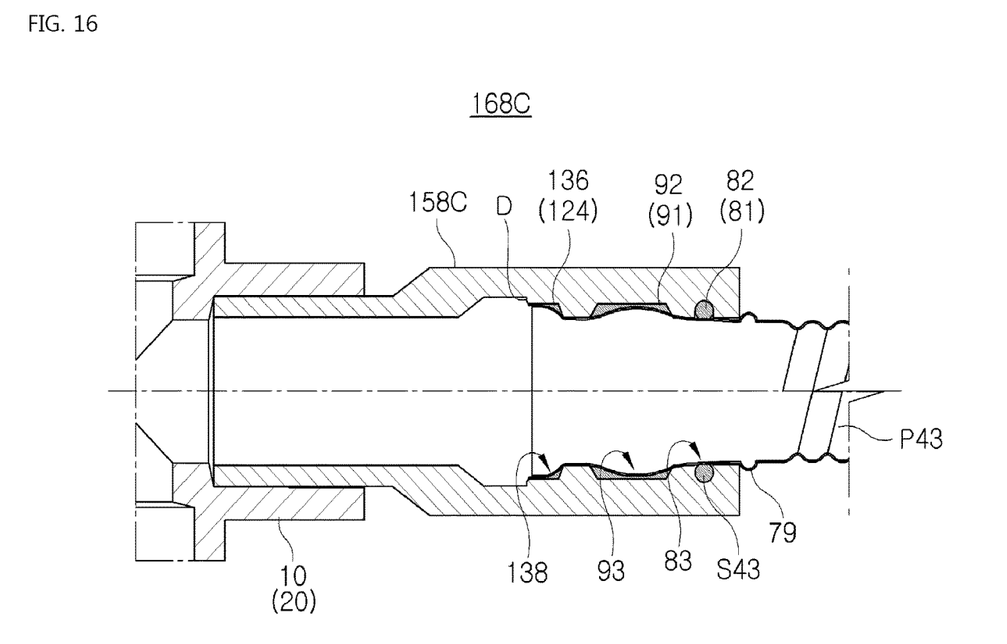
FIGS. 16 and 17 are schematic views illustrating a pipe coupling module for a water distribution system according to a ninth embodiment of the present invention.
Figure 17:
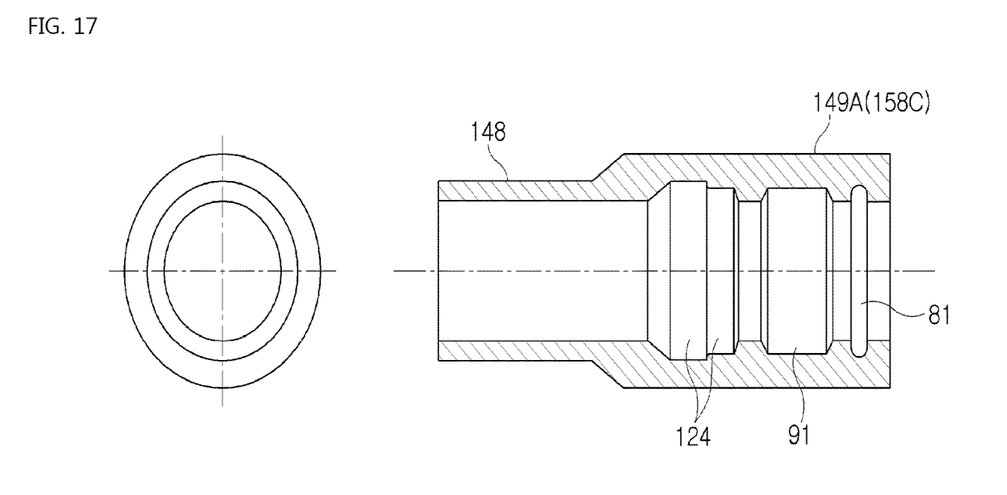

FIGS. 16 and 17 are schematic views illustrating a pipe coupling module 168C for a water distribution system according to a ninth embodiment of the present invention.

Referring to FIGS. 16 and 17, the pipe coupling module 168C is similar to the pipe coupling module 74 of FIGS. 1 to 3, except that a pipe connection socket 158C, a pipe joint unit S43, and a flexible pipe P43 have different structures from those of the pipe connection socket 40, the pipe joint unit 60, and the flexible pipe 51 of FIGS. 1 to 3.

The pipe connection socket 158C has a first end 148 which is fitted into the branch port 10 of the pipe branch section 20, a second end 149A which is disposed opposite to the first end 148 and sequentially has, on an inner surface thereof, a first recess 124 for a circumferentially-cut pad ring, a second recess 91 for a pad ring, and a third recess 81 for an O-ring in a direction towards an end side of the second end 149A, and an intermediate portion extending from the first end 148 towards the second end 149A with an upward inclination.

Here, the first recess 124 for the circumferentially-cut pad ring has a step part D at a middle portion thereof. The pipe joint unit S43 includes a circumferentially-cut pad ring 136, a pad ring 92, and an O-ring 82 fitted into the first to third recesses 124, 91, 81, respectively, provided on the inner surface of the second end of the pipe connection socket 158C.

The flexible pipe P44 has a first enlarged portion 138 for the circumferentially-cut pad ring 136, a second enlarged portion 93 for the pad ring 92, and a third enlarged portion 83 for the O-ring 82, forming an irregular portion in the pipe connection socket 158C such that, when coupled to the pipe connection socket, the irregular portion of the flexible pipe P43 contacts the pipe connection socket 158C and the pipe joint unit S43.

Further, the flexible pipe P43 has a leading end thereof disposed immediately outside of the step part D around the first enlarged portion 138 for the circumferentially-cut pad ring 136, and a stopper protrusion 79 immediately outside of the pipe connection socket 158C, wherein the first enlarged portion 138 for the circumferentially-cut pad ring 136 extends from the leading end in the first recess with a downward inclination, such that the first enlarged portion 138 is compressed by the circumferentially-cut pad ring 136 in the first recess 123B outside of the step part D.

The structure of the pipe coupling module 168C is similar generally to that of the pipe coupling module 168 of FIGS. 12 and 13.

FIG. 18 is a schematic view illustrating a procedure of assembling the pipe coupling module of FIG. 1.

Referring to FIG. 18, the pipe branch section 20 may be connected to the distribution pipe 255. The pipe branch section 20 may be disposed between and connect opposite distribution pipes 255. The pipe branch section 20 and distribution pipe 255 may be formed of CPVC, and joined by means of a solvent cement.

Here, the pipe branch section 20 may have a branch port 10 diverging from the distribution pipe 255. Next, the pipe connection socket 40 may be connected to the pipe branch section 20 such that the first end thereof 34 is fitted into the branch port 10 of the pipe branch section 20.

Here, the pipe branch section 20 and the pipe connection socket 40 may be formed of CPVC and joined by means of a solvent cement. The pipe connection socket 40 extends from the first end fitted into the branch port 10 to the second end 38.

Then, the pipe joint unit 60 and the flexible pipe 51 may be connected to the pipe connection socket 40. The flexible pipe 51 may be internally fastened to the pipe joint unit 60 by means of a joint member provided in the pipe joint unit 60. The pipe joint unit 60 may be disposed on the second end 38 of the pipe connection socket 40.

Here, the pipe joint unit 60 and the pipe connection socket 40 may be coupled together by screw-coupling between the internally threaded part 55 of the pipe joint unit and the externally threaded part 36 of the pipe connection socket 40. Accordingly, the pipe joint unit 60 may form the pipe coupling module 74, together with the pipe branch section 20, the pipe connection socket 40, and the flexible pipe 51. The pipe coupling module 74 may connect the distribution pipe 255 to a sprinkler head (not shown in the drawings).

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pipe coupling module for coupling a distribution pipe and a flexible pipe in a water distribution system, the pipe coupling module comprising:
a pipe branch section couplable to the distribution pipe;
a pipe connection socket couplable directly to the pipe branch section; and
a pipe joint unit couplable to the flexible pipe, wherein:
the pipe connection socket has a first end couplable to a branch port of the pipe branch section; and
the pipe joint unit has a set of rings fittable into a plurality of recesses provided on the inner surface of a second end of the pipe connection socket at a position opposite to the pipe branch section, such that, when the flexible pipe is partially coupled to the pipe connection socket at a position opposite to the pipe branch section, the flexible pipe is compressed by the pipe joint unit in the pipe connection socket,
wherein the pipe connection socket has the first end fittable into the branch port of the pipe branch section, the second end disposed opposite to the first end and sequentially having, on an inner surface thereof, a first recess for a circumferentially-cut pad ring, a second recess for a pad ring, and a third recess for an O-ring in a direction towards an end side of the second end, and an intermediate portion extending from the first end towards the second end with an upward inclination, and
wherein the pipe joint unit has the circumferentially-cut pad ring, the pad ring, and the O-ring fittable into the first to third recesses, respectively, provided on the inner surface of the second end of the pipe connection socket.

2. The pipe coupling module according to claim 1, wherein the pipe branch section comprises a T-branch section or an elbow branch section having a communicating branch port diverging a fluid from the distribution pipe at a specified angle from a longitudinal direction of the distribution pipe.

3. The pipe coupling module according to claim 1, wherein the pipe connection socket is couplable around the branch port of the pipe branch section.

4. The pipe coupling module according to claim 1, wherein the first end of the pipe connection socket is fittable into the branch port of the pipe branch section.

5. The pipe coupling module according to claim 1, wherein the first recess for the circumferentially-cut pad ring has a step part at a middle portion thereof,
wherein the flexible pipe has a first enlarged portion for the circumferentially-cut pad ring, a second enlarged portion for the pad ring, and a third enlarged portion for the O-ring, forming an irregular portion in the pipe connection socket, such that, when coupled to the pipe connection socket, the irregular portion of the flexible pipe contacts the pipe connection socket and the pipe joint unit, and
wherein the flexible pipe has a leading end thereof disposed immediately outside of the step part around the first enlarged portion for the circumferentially-cut pad ring, and a stopper protrusion immediately outside of the pipe connection socket, wherein the first enlarged portion for the circumferentially-cut pad ring extends from the leading end in the first recess with a downward inclination, such that the first enlarged portion is compressed by the circumferentially-cut pad ring in the first recess outside of the step part.

6. The pipe coupling module according to claim 1, wherein the pipe branch section and the pipe connection socket are formed of chlorinated polyvinyl chloride (CPVC) and joinable by means of a solvent cement.

7. The pipe coupling module according to claim 1, wherein the set of rings are formed of rubber.

8. A pipe coupling module for coupling a distribution pipe and a flexible pipe in a water distribution system, the pipe coupling module comprising:
a pipe branch section couplable to the distribution pipe;
a pipe connection socket couplable directly to the pipe branch section; and
a pipe joint unit couplable to the flexible pipe, wherein the pipe connection socket has a first end fittable into the branch port, a second end disposed opposite to the first end and having a stepped outer surface extending with a downward inclination, the stepped outer surface having a plurality of step parts with one externally threaded step part among them, and an intermediate portion extending with an upward inclination between the first and second ends, and
wherein the pipe joint unit has a stepped inner surface extending with a downward inclination, the stepped inner surface having a plurality of step parts with one internally threaded step part among them to correspond to the stepped outer surface of the second end so that, when coupled to the pipe connection socket, the inner surface of the pipe joint unit, including the stepped parts along with the internally threaded step part, is meshed with the outer surface of the second end of the pipe connection socket, including the stepped parts along with the externally threaded step part such that an outer surface of the pipe joint unit is flush with an outermost surface of the intermediate portion of the pipe connection socket.

9. The pipe coupling module according to claim 8, wherein the pipe branch section and the pipe connection socket are formed of CPVC and joinable by means of a solvent cement.

10. The pipe coupling module according to claim 9, wherein the pipe joint unit is formed of CPVC.

11. The pipe coupling module according to claim 8, wherein the pipe branch section comprises a T-branch section or an elbow branch section having a communicating branch port diverging a fluid from the distribution pipe at a specified angle from a longitudinal direction of the distribution pipe.

12. A pipe coupling module for coupling a distribution pipe and a flexible pipe in a water distribution system, the pipe coupling module comprising:
   a pipe branch section couplable to the distribution pipe;
   a pipe connection socket couplable directly to the pipe branch section; and
   a pipe joint unit couplable to the flexible pipe, wherein the pipe connection socket has a first end fittable around the branch port of the pipe branch section, a second end disposed opposite to the first end and having a stepped outer surface extending a downward inclination towards an end side of the second end, the stepped outer surface having a plurality of step parts with one externally threaded step part among them, and an intermediate portion extending from the first end towards the second end with an upward inclination, and
   wherein the pipe joint unit has a stepped inner surface extending with a downward inclination, the stepped inner surface having a plurality of step parts with one internally threaded step part among them to correspond to the step parts of the second end so that, when coupled to the pipe connection socket, the inner surface of the pipe joint unit, including the stepped parts along with the internally threaded step part, is meshed with the outer surface of the second end of the pipe connection socket, including the stepped parts along with the externally threaded step part, such that an outer surface of the pipe joint unit has a stepped level from an outermost surface of the intermediate portion of the pipe connection socket.

13. The pipe coupling module according to claim 12, wherein the pipe branch section and the pipe connection socket are formed of CPVC and joinable by means of a solvent cement.

14. The pipe coupling module according to claim 13, wherein the pipe joint unit is formed of CPVC.

15. The pipe coupling module according to claim 12, wherein the pipe branch section comprises a T-branch section or an elbow branch section having a communicating branch port diverging a fluid from the distribution pipe at a specified angle from a longitudinal direction of the distribution pipe.

16. A pipe coupling module for coupling a distribution pipe and a flexible pipe in a water distribution system, the pipe coupling module comprising:
   a pipe branch section couplable to the distribution pipe;
   a pipe connection socket couplable directly to the pipe branch section; and
   a pipe joint unit couplable to the flexible pipe, wherein:
      the pipe connection socket has a first end couplable to a branch port of the pipe branch section,
      the pipe joint unit has a set of rings fittable into a plurality of recesses provided on the inner surface of a second end of the pipe connection socket at a position opposite to the pipe branch section, such that, when the flexible pipe is partially coupled to the pipe connection socket at a position opposite to the pipe branch section, the flexible pipe is compressed by the pipe joint unit in the pipe connection socket,
      wherein the pipe connection socket has the first end is fittable around the branch port of the pipe branch section, the second end disposed opposite to the first end and sequentially having, on an inner surface thereof, a first recess for a circumferentially-cut pad ring, a second recess for a pad ring, and a third recess for an O-ring in a direction towards an end side of the second end, with a step part provided around the first recess towards the first end, and an intermediate portion extending from the first end towards the second end with a downward inclination,
      wherein the pipe joint unit has the circumferentially-cut pad ring, the pad ring, and the O-ring fittable into the first to third recesses, respectively, provided on the inner surface of the second end of the pipe connection socket, and
      wherein the flexible pipe has a first enlarged portion for the circumferentially-cut pad ring, a second enlarged portion for the pad ring, and a third enlarged portion for the O-ring between a leading end thereof around the circumferentially-cut pad ring and a stopper protrusion thereof immediately outside of the pipe connection socket, forming an irregular portion in the pipe connection socket, such that, when coupled to the pipe connection socket, the irregular portion of the flexible pipe contacts the pipe connection socket and the pipe joint unit.

\* \* \* \* \*